May 27, 1969     F. W. TAYLOR     3,446,612
BASIC FERTILIZERS CONTAINING DERIVATIVES OF AN OLIVINE MINERAL
Filed June 21, 1965
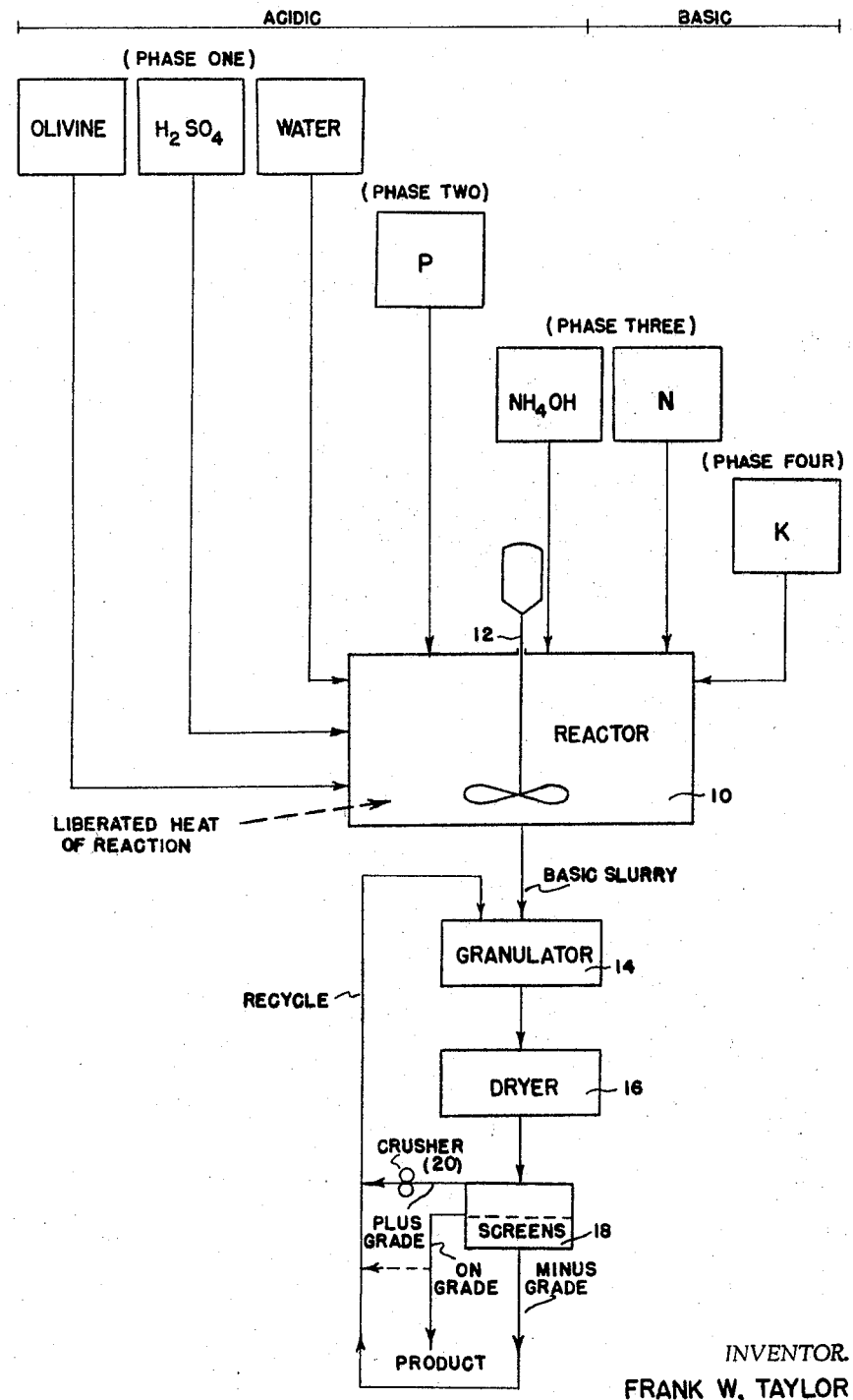
INVENTOR.
FRANK W. TAYLOR
BY Grayhead, Cole, & Barnard
ATTORNEYS United States Patent Office 3,446,612
Patented May 27, 1969

3,446,612
BASIC FERTILIZERS CONTAINING DERIVATIVES OF AN OLIVINE MINERAL
Frank W. Taylor, 4452 Forest Place SE.,
Mercer Island, Wash. 98040
Filed June 21, 1965, Ser. No. 465,292
Int. Cl. C05g 3/00
U.S. Cl. 71—40
11 Claims

ABSTRACT OF THE DISCLOSURE

Finely divided particles of a natural magnesium silicate mineral such as olivine are thoroughly mixed together with sulphuric acid and water to produce a slurry in which the sulphuric acid combines with the mineral and water to form silica gel, magnesium sulphate and ferric sulphate. Substantially at the completion of this reaction $P_2O_5$ is blended into the slurry. Substantially at the completion of the latter reaction ammonia is admixed to said slurry to form a wet basic silicate complex. Urea and ammonia are then added together, with ammonia addition always leading urea addition so that the slurry is maintained basic in character. A potash mineral is admixed to the slurry to provide the K nutrient. The slurry is then dried and the solids are granulated to form a granulated xerogel product of limited solubility.

---

The present invention relates to mixed turf, fertilizers containing N, P, K, S, Mg and Fe nutrients in a silicate complex that includes silica gel, wherein the N nutrient is held in a state of readiness for slow liberation through progressive erosion of the complex, and to a process for producing such fertilizers in which olivine mineral is used for supplying the Mg and Fe nutrients and silica gel.

Olivine (chrysolite) is a natural magnesium-iron silicate mineral, $(Mg,Fe)_2SiO_4$. It is found in igneous and metamorphic rocks (e.g. dunite and peridolite), and is composed of forsterite, $MgSiO_4$; fayalite, $Fe_2SiO_4$ (the minor component); and varying amounts of impurities. Olivine sand (milled particles of about 30–200 mesh in size) is used commercially for refractory purposes, both in fire bricks and as foundry sand. The crushing or milling of the olivine to produce the sand also creates dust-size particles (primarily about minus 200 mesh to micron size) or fines termed "olivine flour." This by-product may constitute up to thirty or forty percent of the crushed product, and with respect to the production of foundry sand is a waste material. A principal object of the present invention is to provide a commercial use for olivine flour, in which certain special properties of the mineral are utilized. According to the invention, the olivine flour is used in the manufacture of a pelleted turf fertilizer to supply certain secondary and trace nutrients and a siliceous binder-filler, making pelleting possible and giving the product the characteristic of being slow-acting.

As is well known, fertilizers are materials which contain one or more nutrient elements essential for plant growth. Soil, being the preponderant medium of plant growth, fertilizers are usually considered as soil amendments to alleviate natural deficiencies and/or to place nutrients removed by plant growth. The mineral elements considered essential to plant growth, and which are obtained by the plant from the soil, are currently classified as primary, secondary, and trace nutrients. The primary nutrients, utilized in large amounts and most likely to be limiting to plant growth, are nitrogen, N; phosphorus, P; and potassium, K. Sulfur, S; magnesium, Mg; and calcium, Ca, are also used by plants in relatively large amounts, but on most soils are not as apt to be limiting, and hence are called secondary nutrients. The so-called minor or trace nutrients, essential to plant growth in minute amounts, include iron, Fe. It is customary to state the analysis or grade of the fertilizer, with respect to the primary nutrients, in the order N-P-K.

According to the present invention, olivine mineral is treated with sulphuric acid, phosphoric acid, and ammonia to release magnesium and iron from the mineral and make them available as usable nutrients. The ammonia and an organic nitrogen additive together provide usable nitrogen; the phosphoric acid provides the P nutrient; and a potash mineral additive provides the K nutrient. Soluble sulphates, formed by the reactions, provide available sulphur. Silica gel is also formed, and it holds or binds together the various nutrients.

The fertilizer product prepared in accordance with the present invention is in the form of small, hard, homogeneous pellets, substantially uniform in size and plant food content. Due to its hard pellet form, such fertilizer is clean and capable of being easily and safely handled and spread. The pellets are not immediately soluble in water, but rather dissolve or erode slowly over a long period of time. Thus, the fertilizer nutrients are not immediately released to the soil, but rather are released slowly, over a prolonged period of time, at about the erosion rate of the pellets. As a result, no over-stimulation or burning of the turf occurs, and only infrequent applications of the fertilizer are necessary.

According to the present invention, and as shown diagrammatically in the accompanying drawing, olivine mineral, $(Mg,Fe)_2SiO_4$, in the form of fine particles (preferably olivine flour), is mixed at ambient temperature with sulphuric acid, $H_2SO_4$, and water, $H_2O$. These three substances, herein referred to as the phase one additives or constituents, are charged into a suitable vessel or reactor 10 fitted with a suitable agitating mechanism 12. The mixture is continuously and gently agitated throughout the process to keep the mineral particles in suspension, so that the sulphuric acid and other reactive additives that follow have free access thereto. The vessel 10 is not completely closed at the top so that the process is conducted at about atmospheric pressure.

Together the phase one constituents form a thick, highly acidic slurry in which the acid reacts with the mineral to cause a release of available Mg and Fe in the form of the soluble salts magnesium sulphate, $MgSO_4 \cdot 7H_2O$, and ferric sulphate, $Fe_2(SO_4)_3$. This reaction is exothermic, and the heat of reaction that is produced causes the temperature of the slurry to rise to approximately 98° C., and expels some of the water. Silicic acid, $H_4SiO_4$, is formed as a gelatinous precipitate, causing the slurry to thicken. During this phase of the process additional water is added to the slurry as needed in order to thin it down to a workable, soup-like consistency.

$P_2O_5$ is added to the slurry substantially at the completion of the acid reaction. Throughout this second phase of the process the slurry remains hot and in a thick soupy consistency. Some of the $P_2O_5$ combines with unreacted mineral and water to form magnesium phosphate, $Mg_3(PO_4)_2 \cdot 4H_2O$, and the rest remains unchanged.

Phase three of the process consists of adding nitrogen. According to the invention, aqua ammonia, $NH_4OH$, is added to the slurry in small doses slightly ahead of small doses of urea, $CO(NH_2)_2$. Both the ammonia and the urea provide available N. The ammonia combined with the metal salts to form ammonium phosphate silicate and ammonium sulphate silicate complexes. It is suspected that some of the ammonia combined with the magnesium phosphate to form magnesium ammonium phosphate and with the magnesium sulphate and ferric sulphate to form magnesium ammonium sulphate and ferric ammonium sulphate, respectively. The reasons for adding both ammonia and urea, and for adding the ammonia in small doses slightly ahead of small doses of the urea, will be hereinafter explained in detail.

At the completion of the third phase the slurry is basic, and from hereon it remains basic. The fourth phase consists of adding a potash mineral to the slurry in an amount sufficient to provide the resulting fertilizer product with the desired percentage of the K nutrient.

The gelatinous precipitate that was produced, and which caused the slurry to thicken, has very high absorptive properties, and it absorbs and hols the various nutrients which were added or produced by the various reactions. Next the slurry is dryed in order to convert it to a dry or xerogel form. As will hereinafter be explained in greater detail, the resulting xerogel product has the properties of silica gel. It does not immediately dissolve when put in water, but will slowly dissolve and can be eroded away over a prolonged period of time. The nutrients are held in particles of such product in a state of readiness for slow liberation through progressive erosion or leaching (by water) of the particles.

As diagrammatically illustrated, formation of the pellets comprises discharging the basic slurry from the reactor 10 into first a granulator 14 and then a dryer 16. The granulator 14 may be of the type patented by the Tennessee Valley Authority, and licensed and manufactured by Edward Renneburg and Sons Co., or Stedman Foundry and Machine Co., Inc., for example. In the granulator 14 the slurry is applied to a bed of dryed and granulated recycle contained in a revolving drum. As the drum rotates, the material is formed into soft, rounded, relatively compact, granules. The soft granules are dried in the dryer 16 to form them into relatively hard, dry pellets. The pellets are then delivered to a set of screens 18 to be sized. The oversized pellets are crushed, and the crushed particles, the undersized pellets, and perhaps a portion of the on grade or properly sized pellets are returned to the revolving drum of the granulator 14 to provide the granulated recycle onto which the next batch of slurry will be applied.

To further illustrate the significant features of the process of this invention, the following example, relating to the production of a 6-2-4 mixed fertilizer, is presented.

Example 455 grams of 140 minus mesh (about 80% passing 200 mesh screen) olivine flour anlyzing 48% MgO, 8% FeO and 40% SiO were cold-mixed with 455 grams of water in an 18.9 liter vessel. Then 152 grams of sulphuric acid, of a concentration of about 93% by weight (66° Bé.) were added as the vessel was rotated and its contents were stirred with a hand-held spatula. The mixture was stirred for about five minutes, and its temperature increased to approximately 85° C.—due solely to liberated heat of reaction. Next, 1,062 grams of additional olivine flour were blended into the slurry. Considerable steam was released, and an additional 455 grams of water had to be added in order to maintain the slurry in a workable consistency, whereby it could be stirred by the spatula. Next 114 grams of triple superphosphate, 45–48% $P_2O_5$, were blended into the slurry. A phosphoric acid-mineral occurred which progressed for approximately five minutes, and during this time the temperature of the slurry stayed at about 85° C.—again due solely to liberated heat of reaction. It was concluded that phosphoric acid supplied by the triple superphosphate was reacting on the magnesium in the olivine flour, aided by the heat liberated by the sulhuric acid reaction, to cause the formation of magnesium phosphate.

114 grams of 29% aqua ammonia were then added to the acidic slurry. This addition was accompanied by the addition of 227 grams of urea. The aqua ammonia was put into one beaker and the urea was put into another. The aqua ammonia was added in small doses or increments slightly ahead of small doses or increments of the urea.

If the ammonia were not added prior to addition of urea, for example, the urea would decompose into ammonia and carbon dioxide. The addition of the ammonia by itself would cause the slurry to thicken and make it necessary to add additional water in order to maintain the slurry workable. The addition of urea by itself would cause the slurry to thin out. For these reasons the ammonia and urea were added substantially together, with the ammonia slightly ahead of the urea. To a great extent the formation by the ammonia of a too thick or unworkable gel was prevented by the thinning properties of the urea. By adding the ammonia in increments slightly ahead of the increments of the urea, the free solution was maintained slightly basic, and decomposition of the urea was substantially prevented. Some additional water had to be added at the end of the total addition of the ammonia and urea, but not as much as when the ammonia and urea were added separately. This was a great advantage because it meant that there was less water in the slurry that had to be later removed by drying, and it resulted in a smaller loss of ammonia to the air.

Following the total addition of the aqua ammonia and urea, 152 grams of murate of potash (60% $K_2O$) were blended into the slurry. After a thorough mixing the slurry was spooned out of the vessel onto a stainless steel sheet and then put into the sun to dry. The drying was lated completed by putting the material into a rotary, direct fired dryer.

A sample of the resulting fertilizer product was analyzed, and the results are as follows:

|  | Percent |
| --- | --- |
| Moisture | 3.50 |
| Nitrogen (N) | 5.96 |
| Phosphate ($P_2O_5$) | 3.40 |
| Potash ($K_2O$) | 4.36 |
| Sulphur (Water Soluble $SO_4$) | 0.27 |
| Sulphur (S) (total of all forms) | 2.40 |

Micronutrients "in Soluble Form."
(California Code)

|  | Percent |
| --- | --- |
| Magnesium (Mg) | 1.62 |
| As Magnesium Oxide (MgO) | 2.68 |
| As Magnesium Sulphate ($MgSO_4$) | 8.00 |
| Iron (Fe) | 0.49 |
| As Ferrous Sulphate ($FeSO_4$) | 1.33 |

The siliceous portion of the product appeared to act as a binder for holding the various nutrients together. Particles of the product were hard and firm solids, and they did not immediately dissolve when put into water. Tests showed that available nitrogen was not immediately washed out of the particles. Further tests conducted over a prolonged period of time showed that the particles could be slowly eroded away, and that the available nitrogen washed or leached out at a rate that was generally proportional to the erosion rate of the particles.

This was a very important discovery. An immediate, complete release of nitrogen from the particles would cause the grass to burn, but a slow release of nitrogen does not cause burning, and also does not cause overstimulation of growth, making frequent mowing of the grass necessary. This discovery also meant that nitrogen release is proportional to water application, either by irrigation or rain. Each time it rains, or the lawn is sprinkled, a little of the nitrogen is leached out from each particle; if water stands in puddles on the lawn, some nitrogen is dissolved, but not all. In the periods between water application, there is essentially no release at all; the nitrogen is in effect "locked in" the particles. Lawn watering thus becomes the release factor that makes the growth element nitrogen available to the plants.

A more detailed consideration of the various additives and steps involved in the process of this invention will now be given.

Olivine—As heretofore explained, a complete series of olivine mineral exists from essentially pure forsterite, $Mg_2SiO_4$, to essentially pure fayalite, $Fe_2SiO_4$. Substantially unaltered olivine (i.e. olivine consisting essentially of pure forsterite and pure fayalite) is very hard (6–7 on the Moh's scale of hardness), is very dense (about 200 lbs./ft.$^3$), and has an extremely high melting point (about 3200° F.). Sand made from such olivine is superior to silica sand for use in making sand molds for both ferrous and nonferrous castings. This is because of its high melting point, its hardness and high density, and because it has a straight line rate of expansion, an angular particle shape, and a base and chilling nature.

Olivine is slightly soluble and deteriorates in the presence of water. Old formations or deposits of olivine are found to have an outer crust of deteriorated or weathered olivine which is softer and less dense than the unaltered portions of the mineral. When the mineral is crushed and milled to form foundry sand, for example, the weathered scale or crust, and other impurities, tend to crush more easily than the unaltered mineral, and tend to be reduced to flour size more so than the relatively pure portions of the mineral. For this reason, the composition and properties of the olivine flour are apt to be different from those of the sand. The minus 200 mesh to micron size particles do not make strong molds for castings, and hence cannot be successfully used for that purpose. However, they can be used for making fertilizer by the process of this invention.

Although it is commercially advantageous to use by-product olivine flour in the manufacture of fertilizer according to the present invention, the olivine mineral could just as well be specially crushed and milled for use in the making of fertilizer, and will have to be in areas where the need of olivine fines for fertilizer manufacture exceeds the supply of by-product olivine flour. A manufactored mill run product of about minus 30 mesh to micro size could be used in this process equally as well as the flour.

With regard to the series requirement of the olivine, as long as sufficient fayalite is present in a given olivine mineral to provide the mineral with an analysis of at least 5%, and preferably 7–10% of FeO, such mineral is acceptable for fertilizer (and foundry) use. If the FeO were below 5%, the mineral would be incapable of supplying the desired quantity of available Fe to the final fertilizer product.

The particular olivine mineral used in the above example came from the "Twin Sisters" mountain region near Bellingham, Washington. There are massive deposits of relatively unaltered olivine in this area (about forty cubic miles in the Twin Sisters mountain alone) which have gained increasing commercial importance in recent years.

Sulphuric acid—The sulphuric acid is added to the reactor 10 in a concentrate of 93% by weight (66° Bé), because it is most easily handled and stored in this form. However, it is cut in the reactor 10 by water previously supplied to the reactor 10. In the above example the concentration of the acid reacting with the olivine was about 23.3% by weight. In practice acid concentrations of about 23–24% have proved to produce the best results. However, acid concentrations of about 15–30% by weight have been found to be usable with varying degrees of success. It was found that if the acid concentration is too great, the mixture will foam, turn plastic, and expand to about three or four times its original volume. A prompt reaction occurred when 18% acid was used, but when 10% acid was tried, the reaction continued to occur slowly for several days or weeks after mixing. As a practical matter, 15% is about the lowest concentration of acid that can be satisfactorily used.

The quantity of $H_2SO_4$ employed is below the theoretical stoichiometric requirement of the mineral. Thus, the acid reacts with only a part of the mineral.

Water—Some of the water that is added to the reactor 10 combines with the olivine and the acid to form the magnesium sulphate and the ferric sulphate. The remaining water exists as free water. The combined water requirement is determined by the quantity of $H_2SO_4$ that is added. The free water is added in order to keep the slurry workable. The quantity of free water that must be added is dependent on: the amount of water lost as vapor of reaction; the thickening effect of the additional flour added after the initial reaction; the thickening effect caused by the $P_2O_5$ addition; the amount of water lost as vapor during the reaction of $P_2O_5$ and the mineral; the thickening effect of the $NH_3$; the thinning effect of the urea; and the thickening effect of the potash addition.

Phosphorus—From a cost standpoint, at the current time at least, triple superphosphate, 45–48% $P_2O_5$, is the preferred source of the phosphate or P nutrient. From a chemical suitability standpoint, normal superphosphate, 18–20% $P_2O_5$, would buffer the reaction and also probably produce some hydrofluoric acid, because of the calcium sulphate, iron and fluorine found therein. Certain dicalcium phosphates developed by the Tennessee Valley Authority may be used. They are not water soluble, but are citric acid soluble, and hence their $P_2O_5$ is available. They are relatively inexpensive and because of their high analysis and low impurities cause no buffering. Ground rock phosphate, 32–33% $P_2O_5$, is also an economical source of available $P_2O_5$.

Nitrogen—Urea and ammonia are both economical and high analysis sources of nitrogen. Both will provide ammonia to combine with the compounds in the slurry to form the basic silicate complex, and either may be used to provide the additional available nitrogen. Urea is particularly suitable for the additional nitrogen because it qualifies as a slow-working organic nitrogen, and when absorbed by the silicate complex it is slower releasing than would be expected. Sulphate of ammonia, 20% N, is another source of nitrogen that might be used.

Potassium—Sylvite (muriate of potash), 60% $K_2O$, is at present the most economical form of the K nutrient. However, there are other soluble salt forms of this nutrient that also may be used. For example, potassium sulphate may be used in fertilizers for areas of the country wherein it is undesirable to add chlorine to the soil.

Pellet formation.—In the granulator 14 the thick slurry is formed into round soft balls. These soft granules are then dried in the dryer 16, to form relatively firm, hard and dry granules or pellets of rounded form. The discharge from the dryer 16 is graded as to size in the screens 18.

The liquid to dry ratio in the granulator determines the size of the granules. Preferably, the equipment is operated to produce an on grade final product within the size range of about 10–14 mesh (i.e. about $\frac{1}{10}$ inch to about $\frac{1}{14}$ inch). The granules of this size should constitute only about 25% (by dry weight) of the screen effluent. The remaining part of the screen effluent is composed of undersized and oversized particles. The oversized granules are run through a crusher 20, and the resulting crushed particles are returned to the granulator, together with the undersized granules, to form a bed necessary to the granulation or additional slurry. The additional slurrry is added to the chamber of the granulator 14 at a rate of about 25% (by dry weight) of the total material in the granulator.

The average size of the on grade granules or pellets may vary from one final product to another, but it is desirable to have a relatively small range of sizes in any given product. Thus, for example, one on grade product may fall within the range of 8–10 mesh; another in the range of 10–14 mesh, another in the range of 8–14 mesh; and yet another in the range of 14–40 mesh.

Rotating drum granulators suitable for use in granulating olivine fertilizers according to the process of the present invention are disclosed in the following U.S.

Patent: Nielsson 2,729,554; Nielsson 2,741,545; Hignett et al. 2,945,754; Phillips et al. 3,012,874; and Hignett et al. 3,043,883. To the extent necessary to a clearer understanding of the present invention, the disclosures of these patents are hereby expressly incorporated herein, by specific reference.

Incremental addition of ammonium hydroxide and urea.—At the conclusion of the phase two addition, the slurry in reaction 10 is acidic. The liquid or free water solution is acidic; the surface solution of each solid particle is acidic; and the liquid in the cracks, crevices and interior pockets of the solid particles is acidic.

Enough ammonium hydroxide is added to make the free water solution slightly basic, then some urea is added. The urea will not break down because it is added to a basic solution. Instead, it dissolves and causes the slurry to thin. After an incremental addition of urea, additional ammonium hydroxide must be added, because the acidic solution in the particles is continuously leaving the particles and passing into the free solution. If some ammonium hydroxide is not added after each incremental addition of urea, and is not added as fast as the acid solution tends to work out of the particles, the free solution in which the urea is in turns acidic, and the urea breaks down. If all of the ammonia needed to neutralize the entire solution were to be added at one time, the slurry would immediately thicken and become a thick, unworkable gelatinous mass.

In view of the foregoing considerations and examples, as well as the features and advantages that are inherent from the disclosed nature and characteristics of the fertilizer product of this invention, various other compositions, formulations and uses of fertilizers will occur to those skilled in the art, within the scope of the following claims.

What is claimed is:

1. A process for producing a basic grass fertilizer containing available N, Mg and Fe comprising:
   mixing finely divided particles of an olivine mineral having a FeO content of at least 5%, which particles are minus 30 mesh in size, with sulphuric acid and water to produce a slurry wherein the sulphuric acid combines with the mineral and water to form silica gel, magnesium sulphate and ferric sulphate, and which has an affinity for substantial amounts of ammonia, and wherein the slurry concentration of the sulphuric acid is within the range of about fifteen to thirty percent (15–30%) by weight;
   admixing ammonia, said ammonia combining with compounds in the slurry to form a wet basic silicate complex containing available N, Mg and Fe; and
   drying the wet basic complex to form a xerogel product of limited solubility.

2. A process according to claim 1, wherein olivine flour is used and said flour includes particles of a size within the range of 200 mesh to micron size.

3. A process according to claim 1, wherein water is added to the mineral and then sulphuric acid of a concentration of about ninety three percent (93%) by weight, 66° Bé., is added to the water and cut thereby until it is of a concentration within the range of about fifteen to thirty percent (15–30%) by weight.

4. A process according to claim 1, comprising admixing ammonia to the free solution in the slurry until it is basic in character, thereafter also admixing urea to the slurry while maintaining such free solution basic in character by continuing to admix ammonia to said slurry.

5. A process according to claim 4, wherein the ammonia and urea are added to the slurry alternately, in increments, with each increment of ammonia being blended into the slurry ahead of an increment of urea to maintain the free solution basic in character.

6. A process according to claim 1, wherein said acid is added in an amount that is substantially less than the stoichiometric requirement of the mineral, so that uncombined mineral remains following completion of the sulphuric acid mineral reaction.

7. A process according to claim 1, wherein the ammonia is added in the form of ammonium hydroxide.

8. A process for producing a basic fertilizer containing available N, P, K, S, Mg and Fe, comprising:
   mixing particles of an olivine mineral having a FeO content of at least 5%, with sulphuric acid and water to form a slurry in which the concentration of the sulphuric acid is within the range of about fifteen to thirty percent (15–30%) by weight, with at least a portion of said mineral being of a particle size permitting its reaction with the acid and water to form silica gel, magnesium sulphate and ferric sulphate;
   then blending $P_2O_4$ into the slurry, whereby magnesium phosphate is formed;
   then admixing ammonia to said slurry to form a wet basic silicate complex containing available N, P, S, Mg and Fe;
   then blending a potash mineral into the slurry to provide the K nutrient; and
   drying the slurry to form a xerogel product of limited solubility.

9. A process for producing a basic fertilizer containing available N, Mg and Fe, comprising:
   mixing particles of an olivine mineral having a FeO content of at least 5% with sulphuric acid and water to form a slurry in which the concentration of the sulphuric acid is within the range of about fifteen to thirty percent (15–30%) by weight, with at least a portion of said mineral being of a particle size permitting its reaction with the acid and water to form silica gel, magnesium sulphase and ferric sulphate;
   admixing ammonia to said slurry to form a wet basic silicate complex containing available N, Mg and Fe, and adding additional water with said ammonia, as needed, to thin said slurry and maintain it workable; and
   drying the slurry to form a xerogel product of limited solubility.

10. A basic grass fertilizer containing available N, Mg and Fe, form by:
    mixing finely divided particles of an olivine mineral having a FeO content of at least 5%, at least a portion of which particles are minus 30 mesh in size, with sulphuric acid and water to produce a slurry in which the concentration of the sulphuric acid is within the range of about fifteen to thirty percent (15–30%) by weight, wherein sulphuric acid combines with mineral and water to form silica gel, magnesium sulphate and ferric sulphate, and which has an affinity for substantial amounts of ammonia;
    admixing ammonia to said slurry, said ammonia combining with compounds in the slurry to form a wet basic silicate complex containing available N, Mg and Fe; and
    drying the wet basic complex to form a xerogel product of limited solubility.

11. A basic fertilizer according to claim 10, the formation of which fertilizer comprises admixing ammonia to the slurry until it is basic in character, thereafter also admixing urea to the slurry while maintaining such slurry basic in character by continuing to admix ammonia to said slurry.

References Cited

UNITED STATES PATENTS

| | | | |
|---|---|---|---|
| 1,889,654 | 11/1932 | Greissbach et al. | 71—62 |
| 2,402,370 | 6/1946 | Chalmers | 71—62 |
| 2,927,851 | 3/1960 | Wilson | 71—62 |
| 3,145,093 | 8/1964 | Wilson | 71—62 |

DONALL H. SYLVESTER, *Primary Examiner.*

T. G. FERRIS, *Assistant Examiner.*

U.S. Cl. X.R.

71—62, 64